United States Patent [19]

Spielau et al.

[11] 4,319,005

[45] Mar. 9, 1982

[54] TERNARY THERMOPLASTIC MOLDING COMPOSITION CONTAINING POLYPROPYLENE COPOLYMERS

[75] Inventors: Paul Spielau, Troisdorf-Eschmar; Werner Kühnel, Neunkirchen-Schöneshof; Dietmar Welsch, Weissenburg; Gerd Klingberg, Lohmar; Hans E. Konermann; Wilfried Leeder, both of Troisdorf, all of Fed. Rep. of Germany

[73] Assignee: Dynamit Nobel Aktiengesellschaft, Troisdorf, Fed. Rep. of Germany

[21] Appl. No.: 249,466

[22] Filed: Mar. 31, 1981

[30] Foreign Application Priority Data

Apr. 2, 1980 [DE] Fed. Rep. of Germany ....... 3012804

[51] Int. Cl.³ .............................................. C08L 23/16
[52] U.S. Cl. ....................................... 525/240; 525/88
[58] Field of Search ................................ 525/240, 88

[56] References Cited

U.S. PATENT DOCUMENTS

4,251,646  2/1981  Smith ..................................... 525/88

FOREIGN PATENT DOCUMENTS

2821342  11/1978  Fed. Rep. of Germany .

*Primary Examiner*—Carman J. Seccuro
*Attorney, Agent, or Firm*—Craig and Antonelli

[57] ABSTRACT

A ternary molding composition is formed of an admixture of ethylene-propylene copolymer, propylene polymer, and polyethylene and contains 30–45% by weight of a partially crystalline ethylene-propylene copolymer with an ethylene content of at least 65% by weight; a melt index MFI (230/5) of 0.7–2.0 g/10 min, and a tensile strength higher than 5.0 N/mm²; 35–65% by weight of propylene polymer with a melt index MFI (230/5) of 15–50 g/10 min, and 3–30% by weight of polyethylene with a melt index MFI (230/5) of 15–50 g/10 min, said molding composition having a melt index MFI (230/5) of at least 8 g/10 min and a tensile strength of at least 15 N/mm² and an elongation at yield of at least 450%.

10 Claims, No Drawings

TERNARY THERMOPLASTIC MOLDING COMPOSITION CONTAINING POLYPROPYLENE COPOLYMERS

The invention relates to a ternary molding composition containing an ethylene-propylene copolymer, a propylene polymer, and polyethylene.

Polypropylene exhibits, besides several very advantageous properties such as, for example, a relatively low density, excellent resistance to higher temperatures and aqueous and non-aqueous liquids, also less favorable characteristics, such as inadequate impact strength at temperatures below room temperature, especially below 0° C. However, adequate impact strength is required and is of importance in many uses, such as, for example, for freight containers, suitcases, automobile parts, and similar products. Polyethylene of high density, of which such molded articles are ordinarily made, does possess this satisfactory high impact strength, but shows a lower resistance to high temperatures.

Ethylene-propylene copolymers, the saturated ones as well as the unsaturated ones, exhibit, besides good mechanical properties, a high aging resistance and ozone resistance, as well as resistance to low temperatures, so that these copolymers are also excellently suitable, in particular, for usages where the product is exposed to weathering. Due to the elastomeric properties of these copolymers it is popular to combine such copolymers with harder polymers.

Many attempts have been made to combine the properties of polypropylene and/or polyethylene and/or ethylene-propylene copolymers by the production of binary or ternary molding compositions. It is known, for example, to utilize mixtures of polypropylene and polyethylene; however, these mixtures exhibit an impact of strength which is hardly improved over polypropylene by itself. DOS Applications [German Unexamined Laid-Open Applications] Nos. 2,202,706 and 2,202,738 disclose blends of isotactic polypropylene and ethylene-propylene elastomers which are either partially crosslinked after blending by adding vulcanizing agents or wherein already partially crosslinked EPM (ethylene-propylene bipolymer) polymer is utilized during the manufacture. Such mixtures, however, still require improvement with respect to the tensile strength values, elongation at yield, tear propagation resistance, as well as the hardness values attainable, measured at 100° C., for many fields of usage, i.e. they do not satisfy the posed requirements for all applications.

Blends of polyethylene with EPDM (terpolyumers of ethylene-propylene and a non-conjugated diene) polymers, the crystallinity of which ranges between 10% and 20%, are known from U.S. Pat. No. 3,919,358. Such products, though exhibiting high tear strengths, do not show sufficient heat resistance due to the low melting temperature of polyethylene; also, permanent deformation, rigidity, and hardness are unsatisfactory.

DOS No. 2,732,969 discloses a binary molding composition of noncrosslinked ethylene-propylene sequence-type polymers with isotactic polypropylene. However, it has been found that such blends experience, inter alia, a relatively large amount of shrinkage during injection-mold dimensionally accurate shaped articles due to the large shrinkage factor; this holds true for complicated molded articles, in particular.

A ternary molding composition that is described in British Pat. No. 1,154,447, contains 50-90% by weight of crystalline polypropylene (insoluble in n-heptane to an extent of more than 90% by weight) and 5-30% by weight of polyethylene and 5-40% by weight of ethylene-propylene block copolymer (insoluble in n-heptane to an extent of 80% by weight). This composition when molded exhibits a tensile strength of only 10 N/mm$^2$ and is no longer flexible at temperatures below −30° C.

In contrast thereto, DOS No. 2,742,910 describes a thermoplastic mixture of elastomers containing 25-85% by weight of a practically amorphous ethylene-propylene copolymer and 15-75% by weight of a crystalline block copolymer of propylene and optionally additional polyethylene. As set forth in DOS No. 2,821,342, this molding composition is in need of improvement regarding hardness, tensile strength, higher stability at high temperatures, and is excelled with respect to these properties, for example, by a molding composition according to DOS No. 2,821,342.

DOS No. 2,821,342 discloses thermoplastic elastomer mixtures containing 30-75 parts of a crystalline, isotactic propylene homopolymer and 25-70 parts of an essentially amorphous, elastomeric ethylene-propylene polymer, and maximally 15 parts of polyethylene, replacing the propylene homopolymer in proportion. These mixtures exhibit, in part, improved properties as compared with binary molding compositions, rendering the mixtures also more suitable for the manufacture of automobile bumpers. However, it has been found that, for extreme stresses, the mechanical properties of the ternary elastomer mixtures known from DOS No. 2,821,342 still are in need of improvement, especially with regard to the notch impact strength and cold flexibility.

The invention is directed to the problem of providing a thermoplastic molding composition which exhibits high thermal stability, good mechanical properties, especially tensile strength values, high cold flexibility, i.e. notch impact strength at low temperatures, and which also can be pelletized and is, in its entirety, improved over the conventional binary and ternary molding compositions with respect to one or several properties. It is likewise an object of the invention to be able to manufacture with simple means such as optimally impact-strong ternary molding composition with desired properties which is not merely an accidental, concomitant result among many such results in conventional molding compositions. The desired molding compositions should also be improved with respect to shrinkage and is to be suitable, in particular, for use in injection molding.

It has now been found that the aforementioned objects can be optimally attained by a molding composition containing:

(a) 30-45% by weight of partially crystalline ethylene-propylene copolymer (i.e. either a bipolymer of ethylene and propylene or a terpolymer of ethylene, propylene and a non-conjugated diene) with an ethylene content of at least 65% by weight, a melt index MFI (230/5) of 0.7-2.0 g/10 min., and a tensile strength higher than 5.0 N/mm$^2$;

(b) 35-65% by weight of a propylene polymer (i.e. a copolymer of a major proportion of propylene and a minor proportion of ethylene) having a melt index MFI (230/5) of 15-50 g/10 min., and (c) 3-30% by weight of a polyethylene homopolymer having a melt index MFI (230/5) of 15-50 g/10 min., wherein the molding composition has a melt index MFI (230/5) of at least 8 g/10 min. and a tensile strength of at least 15 N/mm² and an elongation at yield of at least 450%.

It is completely surprising, in view of the blends known from DOS's Nos. 2,742,910 and 2,821,342, that it is possible by means of this invention to provide, with the use of partially crystalline ethylene-propylene copolymers with a tensile strength amounting to at least 5.0 N/mm², ternary molding compositions having a high impact strength, a high dimensional stability at high temperatures, a high notch impact strength even at low temperatures of −40° C., which molding compositions can additionally be processed excellently into injection-molded articles under avoidance of shrinkage.

The characterization of the invention on the basis of the melt indices is made because of the information contained therein regarding the flowability of the molding composition, which is essential for the processing thereof. The molding composition of this invention is to be processable, in particular, by injection molding and therefore is to exhibit a melt index MFI (230/5) of approximately at least 8.

The molding composition of this invention is further distinguished by the fact that the ethylene-propylene copolymer (a) and the propylene polymer (b) together comprise 70–97% by weight of the molding composition. The ethylene-propylene copolymer (a) utilized exhibits preferably an ethylene content of more than 70% by weight. According to the invention, the partially crystalline ethylene-propylene copolymers are utilized which have a high strength and are also known as very high green strength elastomers. These ethylene-propylene copolymers can be pelletized and thus impart to the molding composition, in total, a processability advantage over the amorphous or almost amorphous ethylene-propylene copolymers which cannot be pelletized, see DOS. No. 2,742,910. An ethylene-propylene copolymer (a) which is an ethylene propylene bipolymer and/or an ethylene-propylene-nonconjugated diene terpolymer is utilized for the molding composition. These copolymers are substantially block copolymers including small parts of random copolymers. The preferred copolymer (a) consists of 65–82% by weight of ethylene, 18–35% by weight of propylene, and 0–8% by weight of a non-conjugated diene tercomponent (third component). The tercomponent is normally dicyclopentadiene, an alkylidene norbornene, an alkenyl norbornene, an alkadiene, or a cycloalkadiene. Preferably, ethylene-propylene-diene terpolymers with a minimum tensile strength of 8.0 N/mm², preferably of a tensile strength ranging above 20 N/mm², are utilized for the molding composition according to the invention.

Especially suitable for the molding composition of this invention are propylene polymers (b) having an ethylene content of up to 12% by weight, with the remainder consisting of propylene. These polymers have an isotactic character.

The ternary molding composition of this invention is especially suitable for the preparation of technical molded components which, on the one hand, are exposed to high temperatures of up to 100° C., but also to very low temperatures of below −30° C., with simultaneous, high mechanical stresses.

A preferred field of use is the production of bumpers for automobiles which must withstand impact stresses even at low temperatures down to −40° C. The molding composition of this invention also satisfies these extreme requirements inasmuch as it exhibits, on the one hand, a sufficient proportion of ethylene-propylene copolymer (a) to attain the necessary notch impact strength at low temperatures, which, however, is accompanied by a certain lowering of the dimensional stability at high temperatures. This lowering of the high-temperature dimensional stability is counteracted by using an amount according to this invention of selected propylene polymers (b), imparting to the molding composition improved mechanical properties at low temperatures and simultaneously a high dimensional stability at high temperatures. The melting ranges of the propylene polymers (b) are preferably above 155° C., preferably between 160° and 162° C. The propylene polymers employed exhibit, however, the disadvantage that they effect, in a blend with ethylene-propylene copolymers (a), a relatively large amount of dimensional reduction (shrinkage) in case of injection-molded articles. This leads to difficulties in the manufature of corresponding, dimensionally accurate injection-molded parts. It has been found surprisingly that the third component (c), i.e. polyethylene, not only introduces its own, otherwise known properties, but apparently also reduces this shrinkage factor and can even extensively compensate for such shrinkage. A polyethylene having an MFI (230/5) value of larger than 15, preferably, however, between 20 and 50, has proven to be especially advantagous; this polyethylene is contained in the molding composition in amounts of between 4 and 30 parts by weight, based on the molding composition, preferably 6–20% by weight. A high-density polyethylene is preferably utilized in this connection.

Preferred molding compositions of this invention, starting with the aforedescribed components with optimum properties, exhibit a ratio of the melt indices MFI of polyethylene (c) to the ethylene-propylene copolymer (d) equal to or larger than 15, preferably, however, larger than 25. In this connection, it is advantageous simultaneously to provide a ratio of melt indices of polyethylene (c) to propylene polymer (b) of between 0.3 and 3.0.

Molding compositions having a preferred formulation according to this invention of 35–43% by weight of the ethylene-propylene copolymer (a), 40–60% by weight of the propylene polymer (b) and 5–20% by weight of polyethylene (d) exhibit a balanced spectrum of desired properties.

The ternary molding compositions of the invention can be produced in a conventional way with the aid of the equipment customary for synthetic resins, such as rolls, extruders, mixers, and masticators, wherein all components can be mixed together simultaneously. The mixing step is to be preferably conducted at an elevated temperature, especially at a temperature of between 180° and 280°, with the use of shear forces.

Additionally, conventional additives, such as coloring agents, mold release agents, fillers, antioxidants, UV stabilizers, flame-retardants, fibers, or the like can be added to the molding composition of this invention.

It is also possible to add the ternary molding compositions of this invention to other synthetic resins, for example to improve the impact strength of the other synthetic resins.

The invention will be described below with reference to several examples along with comparative examples.

The following methods are utilized for testing of the properties:

"MFI (230/5) g/10 min." obtained according to DIN [German Industrial Standard 53735 or MFI (190/2.16)].

"Tensile strength N/mm$^2$" obtained according to DIN 53455.

"Notch impact strength" obtained according to DIN 53455 at various temperatures, un=broken, b=broken.

"Elongation at yield in %" obtained according to DI 53455.

"Vicat softening temperature" indicated as VST/A° C.

Shrinkage measured after 48 hours of storage at room temperature, in mm.

Unless indicated otherwise, the information regarding the MFI refers in all cases to MFI (230/5) g/10 min.

EXAMPLE 1

A binary mixture, provided as a comparison, of 43 parts by weight of an EPDM (about 6% by weight hexadiene, 70% by weight of ethylene, and remainder propylene) having an MFI of 0.8 with 57 parts by weight of polypropylene homopolymer having an MFI of 55 is homogenized and processed into granules. The thus-formed granulated material is injection-molded at 220°–260° C. mass temperature to a molded article in the form of a bumper having a required length of 1436 mm upon removal from the injection mold. By storage at room temperature, a dimensional reduction (shrinkage) of the molded article occurs. After 48 hours, the bumper has only a length of 1435.5 mm, i.e. a shrinkage of −0.5 mm with respect to the desired length.

Additional properties are indicated in the table following Example 12.

EXAMPLE 2

A mixture, provided as a comparison, of 40 parts by weight of an EPDM having an MFI of 0.8 (same as used in Example 1) is homogenized as in Example 1 with 50 parts by weight of a polypropylene homopolymer with an MFI of 55 and 10 parts by weight of a propylene-ethylene copolymer (containing less than 12% of ethylene) having an MFI of 25, and made into granules. A bumper produced from this granulated material under the same injection-molding conditions as set forth in example 1 shows, after 48 hours of storage, a length of −1.5 mm as compared to the required length. This example demonstrates that even a small amount of a propylene copolymer results in a great shrinkage of the molded article. Additional properties are shown in the table.

EXAMPLE 3

A binary mixture of 36 parts by weight of EPDM (same as in Example 1) with an MFI of 0.8 and 64 parts by weight of a propylene-ethylene copolymer (same as in Example 2) with an MFI of 25, made for comparison purposes, is homogenized in a masticator and processed into a granulated material as described in Example 1. The thus-produced granulated material is injection-molded at a mass temperature of 220°–260° C. to a molded article having a required length of 1436 mm upon removal from the injection mold. After storing the molded article at room temperature for a period of 48 hours after removal from the injection mold, the product shows a subsequent dimensional reduction, i.e. shrinkage, of −2.5 mm as compared with the required length.

Additional properties of this binary molding composition are listed in the table.

EXAMPLE 4

Another binary molding composition is produced from a mixture of 39 parts by weight of EPDM (same as in Example 1) having an MFI of 0.8 and 37 parts by weight of a propylene-ethylene polymer (containing less than 12% by weight of ethylene) having an MFI of 25 and 24 parts of a propylene-ethylene copolymer containing less than 12% by weight of ethylene having an MFI of 65, as described in Example 1, and injection into a molded article as described in Example 1. The molded article removed from the injection mold shows, after only 48 hours of storage at room temperature, a shrinkage in length of −1.5 mm as contrasted to the initial required length of 1436 mm. In this connection, it was found that even the use of a readily flowable polypropylene copolymer with a high melt index does not prevent shrinkage of the molded product.

Additional properties are recited in the table.

EXAMPLE 5

A ternary molding composition according to this invention is produced from 36 parts by weight of an EPDM (same as in Example 1) with an MFI of 0.8 and 54 parts by weight of a propylene-ethylene copolymer containing less than 12% with an MFI of 25 and 10 parts by weight of a polyethylene with an MFI (230/5) of 30, and injection-molded to a shaped article, i.e. a bumper, as described in Example 1. After 48 hours of storage at room temperature, the molded article shows a length which has increased by +1.5 mm as compared with the initial required length of 1436 mm.

Other properties are indicated in the table.

EXAMPLE 6

A ternary molding composition of 38 parts by weight of EPDM (same as in Example 1) with an MFI of 0.8 and 52 parts by weight of a propylene-ethylene copolymer containing less than 12% by weight of ethylene with an MFI of 25 and 10 parts by weight of polyethylene with an MFI of 30, as per invention, is processed per Example 3 to a molded component having a required length of 1436 mm. After a storage of 48 hours at room temperature, the molded component shows a length increased by +3.5 mm as compared with the required length. For further properties, see the table.

EXAMPLE 7

As described in Example 1, a binary mixture, provided as comparison and consisting of 35 parts by weight of an EPM (a block copolymer having some random copolymer parts and containing 70% by weight of ethylene and 30% by weight of ethylene) with an MFI of 0.9 and 65 parts by weight of a propylene-ethylene copolymer with an MFI of 25 (as used in Example 6) is produced and injection-molded into a bumper. After 48 hours of storage at room temperature, the bumper shows a shrinkage of −1.5 mm as compared to the required length.

Additional properties can be seen from the table.

EXAMPLE 8

As a further comparative example, a binary mixture is produced from 48 parts by weight of an EPDM (as used in Example 1) with an MFI of 0.8 and 52 parts by weight of a polypropylene homopolymer with an MFI of 55 and injection-molded analogously to Example 1 to form a bumper. After 48 hours of storage at room temperature, the bumper shows a shrinkage of ±0 mm as compared to the required length.

Additional data on the properties of this mixture can be seen in the table.

EXAMPLE 9

As described in Example 1, a mixture according to this invention is produced from 38 parts by weight of an EPM (as used in Example 7) with an MFI of 0.9 and 52 parts by weight of a propylene-ethylene copolymer with an MFI of 25 and 10 parts by weight of polyethylene with an MFI (230/5) of 30, and injection-molded into a bumper. The bumper shows a change of length of +1.5 mm after 48 hours of storage at room temperature.

Further data are shown in the table.

EXAMPLE 10

Example 7 of Table 1 in DOS No. 2,821,342 was utilized as a comparative example. In this example, a mixture is produced from 35 parts by weight of an amorphous EPDM crystallinity below 0.25% and Mooney viscosity [ML $_{1+4}$,125° C.] 52 with a tensile strength of 6.5 N/mm$^2$ and 55 parts by weight of a polypropylene block copolymer with 7% ethylene, a density of 0.905 g/cm$^3$ and an MFI (230/2.16) of 6.0 dg/min, corresponding to an MFI (230/5) of 24, and 10 parts by weight of polyethylene having a density of 0.963 g/cm$^3$; MFI (190/2.16) of 8, and this mixture is injection-molded into a panel. The property values are incorporated and listed in the appended table. The data made in DOS. No. 2,821,342, namely Shore hardness D 54, heat-sag test (mm) 30; flat-drop test, and tear strength yield moderate values for the mechanical properties of the molded article; in particular, the notch impact strength at low temperatures is inadequate.

EXAMPLE 11

Example 7 from table 2 of DOS No. 2,821,342 was incorporated as another comparative example. A mixture is produced from 45 parts by weight of EPDM as in example 11 and 50 parts by weight of a propylene block copolymer as in Example 11, and 5 parts by weight of polyethylene as in Example 11, and the mixture is pressed into a molded component. From the data made in DOS No. 2,821,342 regarding the properties of the panel, such as tensile strength 6.1 N/mm$^2$, elongation at yield 280%, Shore hardness (D) 47, the over-all evaluation can be derived with regard to the mechanical properties that they are only moderately satisfactory; the impact strength at low temperatures is inadequate in any event.

EXAMPLE 12

A ternary molding composition of 41 parts by weight of EPDM (as described in Example 1) with an MFI of 0.8 and 49 parts by weight of a propylene-ethylene copolymer with an MFI of 25 (as described in Example 1) and 10 parts by weight of polyethylene with an MFI of 30 is processed as described in Example 3 into a molded article having a required length of 1436 mm. After 48 hours of storage at room temperature, the molded article has a change in length of +3 mm as compared with the required length.

Additional data are shown in the table.

| Example | EPDM EPM Parts by Wt. + MFI (230/5) + Tens. Str. | PP-HO Parts by Wt. MFI (230/5) | PP-CO Parts by Wt. MFI (230/5) | PE Parts by Wt. MFI 190/2.16 | MFT of Mixture 230/5 | Vi-cat °C. | Elong. at Yield % | Tensile Strength N/mm$^2$ | Notch Impact Strength | | | Shrink-age mm | Evaluation | | |
|---|---|---|---|---|---|---|---|---|---|---|---|---|---|---|---|
| | | | | | | | | | °C. | −20° C. | −40° C. | | Vi-cat | Notch Impact Str. | Shrink-age |
| 1 | 43<br>0.8<br>24.8 | 57<br>55 | | | 17 | 107 | 550 | 28 | un | b | b | −0.5 | good | poor | good |
| 2 | 40<br>0.8<br>24.8 | 50<br>55 | 10<br>25 | | 15 | 106 | 576 | 28.7 | un | b | b | −1.5 | good | poor | poor |
| 3 | 36<br>0.8<br>24.8 | | 64<br>25 | | 12.1 | 113 | 590 | 28.4 | un | un | b | −2.5 | good | good | very poor |
| 4 | 39<br>0.8<br>24.8 | | 37<br>+24<br>65 | 25 | 6.7 | 101 | 593 | 22.2 | un | un | un | −1.5 | mod-erate | very good | poor good |
| 5 | 36<br>0.8<br>24.8 | | 54<br>25 | 10<br>7 | 10.1 | 105 | 740 | 32 | un | un | b | +1.5 | good | good | good |
| 6 | 38<br>0.8<br>24.8 | | 52<br>25 | 10<br>7 | 9.9 | 107 | 620 | 33 | un | un | un | +3.5 | good | very good | good |
| 7 | 35<br>0.9<br>5.75 | | 65<br>25 | | 9.9 | 114 | 630 | 25.6 | un | un | un | −1.5 | good | very good | poor |
| 8 | 48<br>0.8<br>24.8 | 52<br>55 | | | 13.2 | 95 | 610 | 20.7 | un | un | b | ±0 | poor | good | good |
| 9 | 38<br>0.9<br>5.75 | | 52<br>25 | 10<br>7 | 8 | 105 | 455 | 21.4 | un | un | un | +1.5 | good | very good | good |
| 10 | 35<br>—<br>6.5 | | 55<br>24 | 10<br>8 | 7.6 | 103 | | ∼10[1] | | | | | mod-erate | poor | |
| 11 | 45<br>—<br>6.5 | | 50<br>24 | 5<br>8 | 1.6 (190/ ) | | 280 | 6.1 | | | | | | | |
| 12 | 41 | | 49 | 10 | 9.1 | 104 | 580 | 30.1 | un | un | un | +3 | good | very | good |

-continued

| Example | EPDM EPM Parts by Wt. + MFI (230/5) + Tens. Str. | PP-HO Parts by Wt. MFI (230/5) | PP-CO Parts by Wt. MFI (230/5) | PE Parts by Wt. MFI 190/2.16 | MFT of Mixture 230/5 | Vicat °C. | Elong. at Yield % | Tensile Strength N/mm² | Notch Impact Strength | | | Shrinkage mm | Evaluation | | |
|---|---|---|---|---|---|---|---|---|---|---|---|---|---|---|---|
| | | | | | | | | | °C. | −20° C. | −40° C. | | Vicat | Notch Impact Str. | Shrinkage |
| | 0.8 24.8 | | 25 | 7 | | | | | | | | | | good | |

[1] Analogously to tear strength.
[2] From evidence of brittle fracture; what is brittle is not flexible at low temperatures.

It will be observed from the data presented in the table, that the table contains a compilation of the afore-described examples with the most important properties indicating data regarding the desired profile of required properties for technical components under high stresses such as automobile bumpers, for example. The MFI of the total mixture is an indication of the flow properties and thus of the suitability for injection-molded processing; in this connection, MFI values starting with about 8 are a yardstick for good processability. The Vicat value stands for good dimensional stability under heat; elongation and tensile strength indicate the general mechanical properties; notch impact strength is a measure for cold flexibility at extremely low temperatures; and the shrinkage is a measure for the quality and dimensional stability of the molded articles producible by injection-molding. The evaluation set forth in the table is made with the object of providing a high requirement profile of several properties. It can clearly be seen from the table that frequently unilaterally high property values are coupled with other, poor values. The many comparative examples numbered 1–4, 7, 8, 10, and 11 show clearly that, respectively, one or several of the desired properties are inadequate to satisfy the requirement profile according to the invention, and that the invention according to examples 5, 6, 9, and 12 is a molding composition for providing good to very good characteristic in all desired properties.

Examples 1 and 8 demonstrate that binary thermoplastic mixtures of EPDM and a propylene homopolymer, with too low a content of EPDM, do not exhibit sufficient cold flexibility (Example 1) and, with a higher content of EPDM, show a low dimensional stability under heat (Example 8). It is impossible to optimize the desired properties.

Example 2 shows that, by adding propylene-ethylene copolymers to mixtures according to Example 1, an adverse effect is exerted on the shrinkage of the molded components, i.e. such shrinkage is aggravated, and otherwise there are no improvements in the desired property values, either.

Example 3 demonstrates that binary mixtures of EPDM and propylene-ethylene copolymers are superior to mixtures of Example 1 with polypropylene homopolymers with respect to cold flexibility, but display considerable shrinkage which has an adverse effect on the processability to dimensionally accurate injection-molded components with a complicated configuration.

Example 4 shows, as compared to Example 3, that the addition of very well flowable propylene-ethylene copolymers (MFI 65) cannot compensate for the disadvantage of excessive shrinkage.

Example 5 of a molding composition according to this invention exhibits a well-balanced spectrum of properties as compared with the binary molding compositions according to the preceding examples. The MFI of 10 displayed by the molding composition indicates the very ready injection-moldability, and the mechanical properties of tensile strength, elongation at yield, can likewise be called satisfactory; notch impact strength is present down to −30° C.

Example 6 shows that the properties of the molding composition of this invention can be further improved by a slight increase in the EPDM proportion at the cost of the propylene-ethylene copolymer, especially with regard to cold flexibility and shrinkage. In this connection, it is surprising that the high dimensional stability at high temperatures remains preserved (as contrasted to the characteristics according to Examples 1 and 8).

Example 7 discloses a binary molding composition on the basis of EPM with a propylene-ethylene copolymer. In the case, analogous property spectra are encountered as in case of the binary molding compositions on the basis of EPDM, the shrinkage characteristic being disadvantageous, and thus the injection moldability of complicated shaped articles of high dimensional accuracy is made questionable.

Only the ternary molding composition according to Example 9 on the basis of EPM shows good and very good property values in all required ranges, wherein by a further increase of the EPM proportion, the injection moldability can be even further enhanced, while the remaining characteristic values do not suffer impairment.

Examples 10 and 11 illustrate the conventional ternary molding compositions based on amorphous or almost amorphous ethylene-propylene copolymers and resulting in an entirely different spectrum of properties; in particular, the products cannot display the high mechanical properties such as elongation at yield and tensile strength and, in no case the desired high cold flexibility.

What is claimed is:

1. A ternary molding composition formed of an admixture of ethylene-propylene copolymer, propylene polymer, and polyethylene which comprises:
   (a) 30–45% by weight of a partially crystalline ethylene-propylene copolymer with an ethylene content of at least 65% by weight; a melt index MFI (230/5) of 0.7–2.0 g/10 min, and a tensile strength higher than 5.0 N/mm²;
   (b) 35–65% by weight of propylene polymer with a melt index MFI (230/5) of 15–50 g/10 min, and
   (c) 3–30% by weight of polyethylene with a melt index MFI (230/5) of 15–50 g/10 min, said molding composition having a melt index MFI (230/5) of at least 8 g/10 min and a tensile strength of at least 15 N/mm² and an elongation at yield of at least 450%.

2. A molding composition according to claim 1, wherein the ethylene-propylene copolymer and the propylene polymer together comprise 70–97% by weight of the molding composition.

3. A molding composition according to one of claims 1 or 2, wherein the propylene polymer has a melt index MFI (230/5) of between 20 and 40.

4. A molding composition according to one of claims 1 or 2, wherein the polyethylene has a melt index MFI (230/5) of between 20 and 40.

5. A molding composition according to one of claims 1 or 2, wherein the propylene polymer is a propylene-ethylene copolymer having an ethylene content of below 12% by weight.

6. A molding composition according to claim 1, wherein the ethylene-propylene copolymer comprises a bipolymer or a terpolymer made up of 65–82% by weight of ethylene
18–35% by weight of propylene
0–8% by weight of a non-conjugated diene tercomponent.

7. A molding composition according to claim 6, wherein the ethylene-propylene copolymer has an ethylene content of more than 70% by weight.

8. A molding composition according to claim 6 or 7, wherein the ethylene-propylene copolymer is a terpolymer having a tensile strength of at least 8 N/mm$^2$, preferably higher than 20 N/mm$^2$.

9. A molding composition according to claim 1, wherein the composition contains 35–43% by weight of the ethylene-propylene copolymer (a), 40–60% by weight of propylene polymer (b), and 5–20% by weight of the polyethylene (c).

10. A bumper for an automobile molded by injection-molding from the molding composition of claim 1.

* * * * *